June 10, 1930. B. J. CHROMY 1,763,220
SOUND RECORDING APPARATUS
Filed Sept. 17, 1928
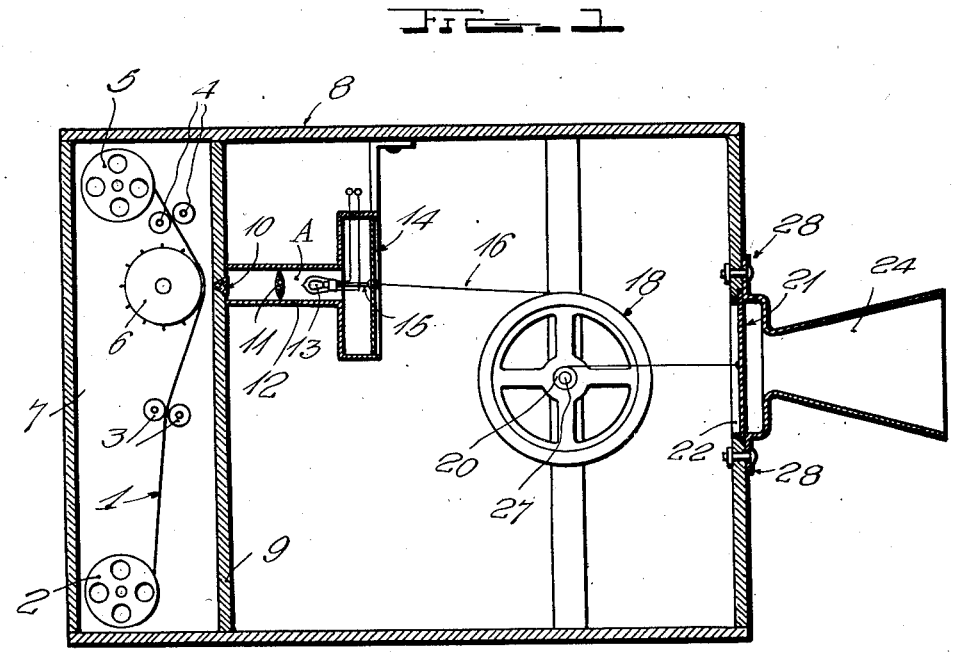
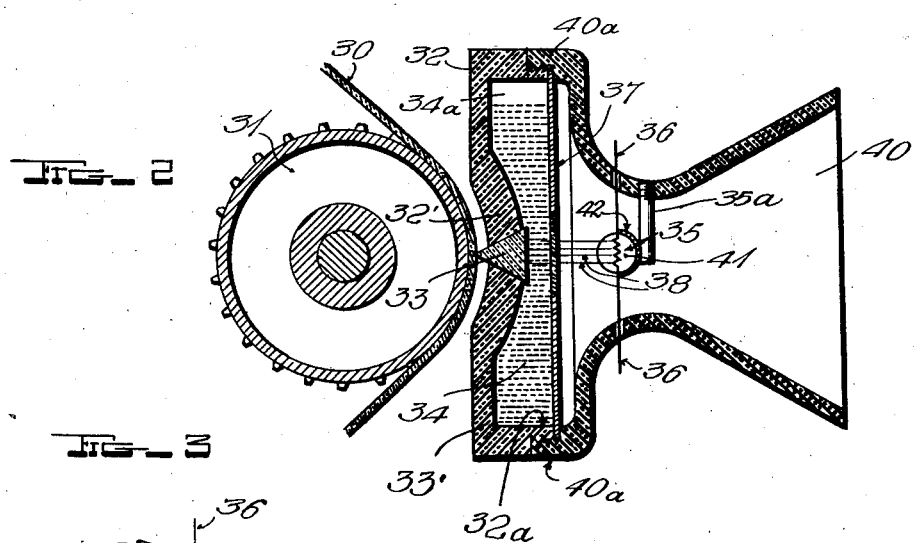
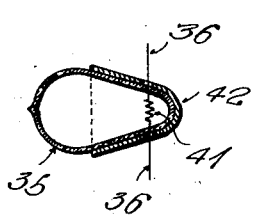
INVENTOR.
Ben J. Chromy,
BY John B. Brady
ATTORNEY.

Patented June 10, 1930

1,763,220

UNITED STATES PATENT OFFICE

BEN J. CHROMY, OF HOPKINS, MINNESOTA, ASSIGNOR TO WIRED RADIO, INC., OF NEW YORK, N. Y., A CORPORATION OF DELAWARE

SOUND-RECORDING APPARATUS

Application filed September 17, 1928. Serial No. 306,541.

This invention relates to sound recording systems generally and more specifically to sound recording systems employing a light sensitive film.

An object of this invention is to provide a sound recording apparatus which has a substantially uniform frequency response characteristic.

Another object of this invention is to provide a sound recording device in which the mechanical vibrations are transformed directly into light pulsations at a given point.

A further object of this invention is to provide a sound recording device in which a light absorbing medium intervenes between the light source and the film and in which the intensity of light absorbed is varied in accordance with sound vibrations being recorded.

Other objects and features of this invention will be apparent to any one skilled in the art of recording sound from the following specification and claims.

In this invention I provide means whereby sound waves are transformed directly into light fluctuations and recorded on a light sensitized surface. This I accomplish by increasing or diminishing the amount of light absorbed between the light sensitive surface and the light source. The intensity of the light given off by the light source remains the same.

In the drawing Fig. 1 is a cross-sectional view of sound recording apparatus embodying this invention. Fig. 2 shows a modified form of sound recording device constructed in accordance with this invention. Fig. 3 illustrates a detail view of a light source having a reflector upon a surface thereof.

Referring to Fig. 1 of the drawing in detail, 1 designates a light sensitive film strip wound upon a reel 2. The film strip 1 is passed through the guiding revolving members 3, over the sprocket 6, through the guiding members 4 and is then wound upon the reel 5.

The film and film reels are confined in the compartment 7 of the cabinet 8. The compartment 7 is divided off from the remainder of the cabinet by the partition 9.

The light rays originating at the incandescent lamp 13 pass through a light absorbing medium A, a lense system 11 and a concentrating member 10 to the film strip 1. The lamp 13 is supported by a rigid member 15 which is attached to an elastic diaphragm 14. The concentrating member 10 projects through an aperture in the partition 9 adjacent to the sprocket 6.

A tube shaped member 12 having an enlarged mouth within which the diaphragm 14 is attached is supported adjacent to the concentrating member 10 with its smaller end surrounding the large end of the concentrating member. The light concentrating member 10 is of an elongated shape so that the light rays passing through it from the light source 13 are concentrated by it even though the focal point of the lens 11 is caused to shift within the concentrating member as a result of the movement imparted to the lamp 13. By properly shaping this concentrating member 10 it is not necessary that the focal point of the lens system always appear within the member itself. This point may appear at some place between the member 10 and the lens 13. The lens system 11 is fixed within the tube member 12. The light absorbing medium A which consists of a gas, such as air or carbon dioxide or any other light absorbing gas or mixture of gases is confined in the space around the lamp 13. If air is used as the absorbing medium then it is not necessary to provide partitions at the rear of the lamp to confine the gas around the lamp unless the gas is maintained at a slightly higher than atmospheric pressure.

A flexible cord 16 is attached to the center of the diaphragm 14 and to a point on the periphery of the circular member 18. The circular member is made as light as possible in order to reduce its moment of inertia.

The circular members 18 and 20 are mounted upon a shaft 27 together so that both will be rotated when the shaft 27 is rotated. One end of a flexible cord 19 is attached to the circular member 20 and wound about the periphery of this member several times. The other end of the cord 19 is attached near the center of the diaphragm 21.

The diaphragm 21 is held in an aperture cut into a wall of the cabinet 8 by the ring 22 and a flange 28 of the speaking tube 24. The tube 24 is attached to a wall of the cabinet 8 by the screws 23.

In Fig. 2 of the drawing the reference character 30 designates a film strip and 31 designates a sprocket for moving the film strip past a quartz light ray concentrating member 33. The light ray concentrating member 33 is mounted in an aperture in the back 32' of the casing 32. A diaphragm 37 is clamped between the edges of the side wall 32ᵃ of the casing 32 and the flange 40ᵃ of the speaking tube 40. The side wall 32ᵃ and the flange 40ᵃ are each threaded.

The casing 32 may be made of phenol condensation products, hard rubber or any other insulating material. The diaphragm 37 may be made of transparent material, such as celluloid, or it may be made of very thin sheet metal, such as steel or bronze, and an aperture of thin quartz may be provided in its center in axial alignment with the concentrating member 33 and the lamp 35.

A light absorbing liquid, such as a solution of calcium chloride or a solution of potassium permanganate or various kinds of oils, partially fills the compartment 34. A small empty space 34ᵃ is left at the top of the compartment 34.

The incandescent lamp 35 is suitably supported in the constricted portion of the speaking tube 40 and is connected by the leads 36 which extend to the filament 41 of the lamp. The source of electric current for heating the filament 41 of the lamp 35 is connected to the leads 36. A small parabolic reflector 42, as illustrated in Fig. 3, may be provided on one side of the lamp 35 to concentrate the light rays of the lamp upon the member 33 and to prevent the light rays from the lamp from annoying the person speaking into the tube. The lamp 35 is preferably very small, such as is often used in surgical instruments. These lamps usually have incorporated in them a small reflector for concentrating the light rays transmitted from the filament in a small well defined pencil or beam. The lamp 35 is rigidly supported by the arm 35ᵃ to prevent its movement with respect to the tube 40.

The operation of the device shown in Fig. 1 is as follows. Sound waves impinge upon the diaphragm 21 and cause it to vibrate. The vibrations of the diaphragm are transmitted to the small disc member 20 through the flexible cord 19. The light disc member 18 is caused to vibrate and transmit the vibrations to the diaphragm 14 and the lamp 13. More or less light absorbing medium A is caused to intervene between the lamp 13 and the film 1 in accordance with the sound waves or other mechanical vibrations actuating the diaphragm 21. These waves are caused to be recorded upon the film 1.

In the modified form of the invention illustrated in Fig. 2 mechanical vibrations impinge upon the diaphragm 37 and cause the length of the path of the light rays through the light absorbing liquid in the compartment 34 between the lamp 35 and the film 30 to increase or diminish in accordance with the character of these vibrations. The light rays reaching the film 30 will be modulated in accordance with these vibrations and the character of these vibrations will be recorded upon the film.

Having thus described the preferred forms of my invention I desire it understood that I do not intend that any limitation be placed upon my invention other than that imposed by the appended claims.

What I claim as my invention and desire to secure by Letters Patent of the United States of America is:

1. In a device of the class described the combination of a light sensitive film, a light source, a light absorbing medium interposed between said light source and said light sensitive film, and means for varying the intensity of light absorbed by said light absorbing medium in accordance with mechanical vibrations of sound waves for recording these vibrations on said film.

2. In a sound recording device the combination of a light sensitive film strip, a diaphragm adapted to be actuated by mechanical vibrations, a light source, and means associated with said diaphragm for moving said light source to and from said film said movement being governed by mechanical vibrations impinging upon said diaphragm.

3. In a device for recording sound upon a sensitized film the combination of a light sensitive film strip, a diaphragm adapted to be vibrated by sound waves, a light source, means for directing a pencil of light from said light source to said sensitive film, and means for moving said light source with respect to said film in accordance with sound waves impinging upon said diaphragm.

4. In a device of the class described the combination of a flexible diaphragm adapted to be vibrated by sound waves, a source of light rays, a light sensitized film strip interposed in the path of said light rays, a light absorbing medium intervening between the light source and the film, and means associated with said diaphragm for varying the intensity of light absorbed by said light absorbing medium in accordance with sound vibrations actuating said diaphragm.

5. In a device of the class described the combination of a sensitized film strip, a light source of constant intensity, means for directing a beam of light from said light source to said film strip, a diaphragm actuated by sound waves, and means associated with said diaphragm for varying the intensity of the light beam impinging upon said film surface in accordance with sound waves actuating said diaphragm.

6. In sound recording devices the combination of a light sensitive film, a light source of constant intensity, means for directing a beam of light from said light source to said film and a light absorbing medium in the path of said beam of light, said light absorbing medium being adapted to modulate said beam of light in accordance with mechanical vibrations to be recorded on said film.

In testimony whereof I affix my signature.

BEN J. CHROMY.